Figures 1, 2:
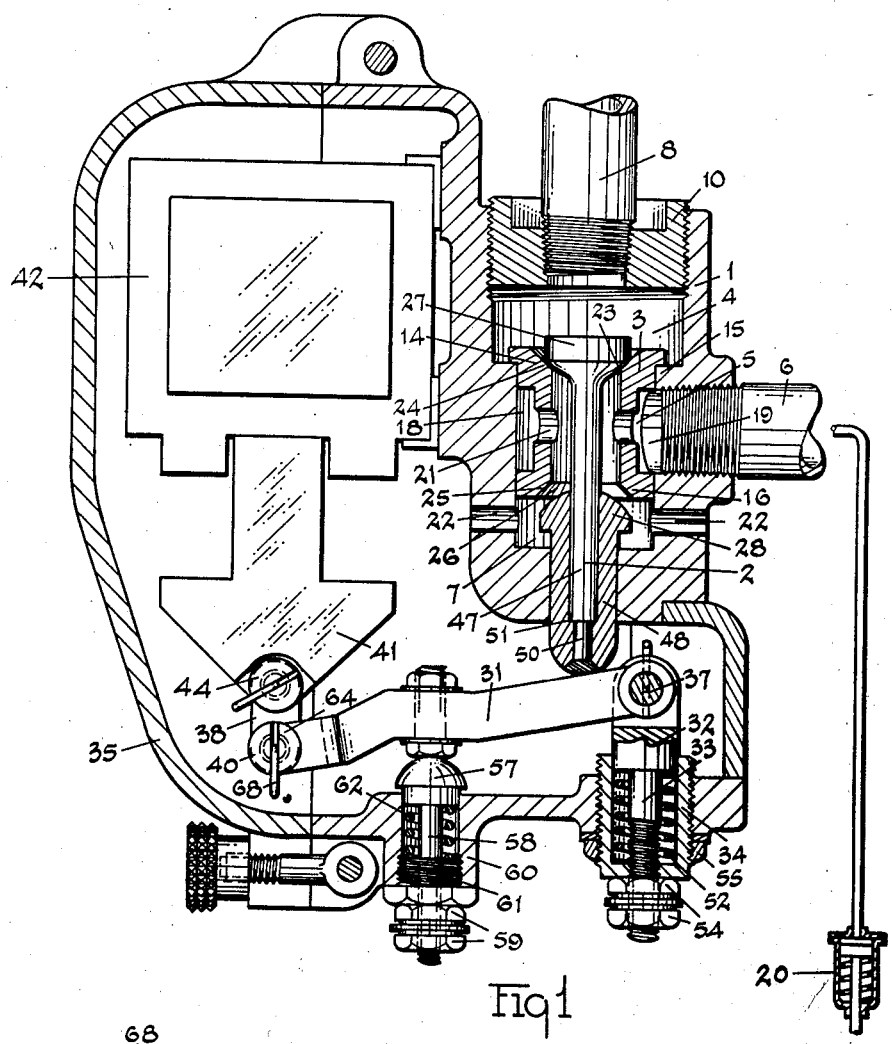

Feb. 28, 1939.  W. H. MARTIN  2,148,703

SAFETY FLUID PRESSURE CONTROL VALVE

Filed May 19, 1938

Inventor
William H. Martin
By [signature]
Attorney

Patented Feb. 28, 1939

2,148,703

UNITED STATES PATENT OFFICE 2,148,703

SAFETY FLUID PRESSURE CONTROL VALVE

William H. Martin, Detroit, Mich.

Application May 19, 1938, Serial No. 208,845

1 Claim. (Cl. 277—20)

My invention relates to valves for controlling transmission of fluid pressure to devices operated or controlled thereby. The invention particularly provides an electromagnetically operated poppet-valve for controlling transmission of fluid pressure through the valve to a device, the valve having means for short-circuiting the connection between the device and the valve from the fluid pressure inlet of the valve to an exhaust outlet of the valve and, thereby, prevent transmission of pressure until the fluid pressure inlet is fully open and the exhaust outlet is completely closed, and, also, while the fluid pressure inlet is partially open and wherein the closure of the exhaust outlet, when made, is resiliently maintained in its relation to the electromagnetically operating means.

The invention also provides resilient buffer elements for shock-absorbing the movable valve member and the actuating elements of the electromagnetic means.

The invention may be contained in valves of different forms and used for different purposes. To illustrate a practical application of the invention, I have selected a safety valve for controlling fluid pressure operated devices of different forms and particularly to prevent actuation of the devices upon imperfect operation of the valve. The particular valve selected, as an example of an embodiment of my invention, is shown in the accompanying drawing and described hereinafter.

Fig. 1 illustrates a view of a section of the valve. Fig. 2 illustrates a detail of construction of one or more of the parts of the valve.

The valve shown in the drawing comprises a valve casing 1 and a movable valve member 2. The interior surface of the casing 1 is cylindrical in form and is divided into chambers by a flanged sleeve 3. The flanged ends of the sleeve form partitioning walls which separate the chambers. The chambers thus formed comprise a pressure inlet chamber 4, a pressure outlet chamber 5, and an exhaust chamber 7.

The pressure chamber 4 is connected to a source of pressed fluid by means of a pipe 8. The pipe is connected to a threaded plug 10 secured in a tapped end of the casing 1. The inlet chamber 4 has a diameter greater than the remainder of the interior of the casing. The sleeve 3 is located and secured in the central part of the interior of the casing by a tight or press fit of the flanges 14 and 16. It is forced into the casing until a protruding part of its flange 14 engages the shoulder 15, formed by the difference in the diameters of the parts of the interior of the casing. The sleeve 3 is provided with an annular recess 18, formed between the flanges 14 and 16, which communicates with the interior of the sleeve through openings 21. The spaces intermediate the flanges 14 and 16 form the pressure outlet chamber 5 of the valve casing 1. The pressure outlet chamber communicates, through the pressure outlet port 19, with the pipe 6, which is connected to a fluid pressure operated device of any form, such as the device 20. The exhaust outlet chamber 7 is formed intermediate one end of the sleeve 3 and the lower end of the interior of the casing. The casing is provided with one or more outlets 22 for exhausting the fluid from the valve. The outlets may also constitute the exhaust outlet of the device operated or controlled by the fluid pressure. When air is used as the medium of transmission of pressure, the outlets may open to the atmosphere. Where a liquid is used, the outlets will ordinarily be connected to a relatively large chamber or passageway for the free flow of the liquid and enable its ready exhaustion into an open tank or reservoir.

The opposite ends of the sleeve 3 are provided with valve seats 24 and 25. The movable valve member 2 is double-headed and is provided with the heads 27 and 28, which seat on and fit, respectively, the seats 24 and 25 to close one or the other of the ends of the sleeve 3. The ends of the sleeve form the inlet pressure port 23 and the exhaust port 26. Closure of the inlet pressure port 23, or slight opening of the exhaust port 26, prevents the transmission of pressure to the pressure outlet port 19, the pipe 6, and the device 20 connected thereto, and closure of the exhaust port causes transmission of pressure through the pressure outlet port. The connection of the valve heads 27 and 28 of the movable valve member is such that if there should be leakage through either of the ports 23 or 26, there will be the same leakage through the other of the ports and transmission of pressure will be prevented.

The distance between the seat-contacting areas of the valve heads 27 and 28 is greater than the distance between the corresponding areas of the valve seats of the sleeve 3, whereby, when the valve head 27 is in its port-closed position, the outlet pressure chamber 5 is connected with the exhaust chamber 7, where the pressure is zero with reference to the operating pressure of the device 20. When the valve head 28 is seated against the seat 25, the valve head 27 is in its wide port-opening position and the pressure of the fluid is transmitted to the device 20.

Thus, in the reciprocation of the movable valve member 2, the ends of the sleeve 3 will be alternately opened and closed, and when one valve head is located in its extreme open position, the other valve head is seated, and, if for any reason, a valve head is not in its full opened position, the other head will not be seated on its associated valve seat and the fluid will exhaust at practically no pressure without transmission of any material pressure to the device connected thereto. Hence, if, for any reason, the valve member is disposed in an intermediate position with respect to the seats, the fluid will be exhausted through the exhaust chamber and no pressure will be transmitted through the pipe 6. Thus, if any foreign material accumulates, or a body, such as a metal chip, lodges intermediate either of the valve seats and its associated head to hold either of the valve heads in spaced relation with respect to its seat and produce even a minute leakage, the fluid will be exhausted from the valve through the exhaust chamber and no pressure will be transmiteed through the pipe 6 to the device.

The valve is, normally, automatically closed to prevent escape of fluid from the fluid inlet chamber 4 by the pressure of the fluid. The movement of the fluid carries the valve head 27 against the seat 24 and the pressure of the fluid presses the valve head against the seat to tightly close the valve to prevent the escape of the fluid through the valve. The valve is opened by the operation of a lever 31, which is fulcrumed on the head of the pin 33 located in a threaded thimble 34 adjustably secured in the wall of a shell 35. The lever 31 is pivotally connected to the head 32 of the pin 33 by means of a cap screw 37. The other end of the lever 31 is bifurcated and connected to a link 38 by means of a cap screw 40. The link is connected to the end of a core 41 of a solenoid 42 by a cap screw 44. The lever 31 is, thus, electromagnetically operated to move the valve member against the fluid pressure on the upper end of the valve member. Once the head 27 is moved from the valve seat, the air pressure on the head is greatly reduced and the lever is freely pulled upward by the solenoid until the head 28 engages the seat 25 to close the connection between the outlet pressure chamber 5 and the exhaust chamber 7.

Preferably, the head 27 of the movable valve member 2 is provided with a stem 47 on which is located a sleeve 48 that is pressed on the end of the stem 47. The upper end of the sleeve forms the head 28 of the movable valve member. The lower end 50 of the stem 47 is reduced in diameter and the lower end of the sleeve 48 has an inner diameter of corresponding reduction to form shoulders 51 on the sleeve and the stem, that interengage. The end of the sleeve is countersunk and the end of the stem 47 is headed by heat and pressure to secure the sleeve in position on the stem.

The lower end of the sleeve 48 is rounded and the rounded end engages the lever 31 near the fulcrum-supporting pin 33. The pin 33 is spring-pressed by the spring 52 located intermediate the head 32 and the bottom of the thimble 34. The pin 33 is threaded and extends through the end of the thimble 34, and the tension of the spring 52 is adjusted by means of the nuts 54. The location of the thimble 34, with reference to the movable valve member 2 and, particularly, the lower end of the sleeve 48, is adjusted by rotation of the thimble in the wall of the shell 35. It is secured in its adjusted position by means of the nut 55. When the solenoid 42 is energized to raise the core 41, the spring 52 operates to cushion the valve member 2 when the head 28 engages the seat 25 and, also, to cushion the movement of the core 41 as it approaches the limit of its upward movement by the operation of the solenoid. This is of advantage in view of the fact that the fluid pressure on the valve head 27 is maximum at the initial opening movement and is suddenly reduced while subjected to the pull of the solenoid. The spring 52 operates to cushion the effect of the momentum of the core and to resiliently press the valve closed.

The reverse movement, to close the passageway through the upper end of the sleeve 24, is produced by deenergization of the solenoid 42, and the outward movement of the fluid causes the valve member to follow the lever. The lever engages the head 57 of the pin 58 located in a boss 60 formed in the wall of the shell 35, when it descends to pen the exhaust outlet. The boss 60 is bored to form a chamber therein. It is also tapped and a screw plug 61 is secured in the chamber formed in the boss 60. The pin 58 extends through the plug 61. A spring 62 is located in the boss 60 and intermediate the plug 61 and the head 57 of the pin 58. The outer end of the pin is threaded and spring adjusting nuts 59 are located on the end of the pin for adjusting the tension of the spring 62. The thimble 34 is adjusted to locate the lever in contact with the end of the sleeve 48 when the valve member 2 is held closed by the pressure of the fluid, and the springs 52 and 62 are adjusted relative to each other to produce a desired shock-absorbing resiliency to reduce hammering of the parts of the valve.

In order to prevent unloosening of the cap screws 37, 40, and 44, and their nuts 63, the nuts 63 and the heads 64 of the screws are slotted, as at 65, and the heads and nuts are centrally bored to form holes, as at 67, and elastic U-shaped wires, having short inturned ends 70, are elastically secured in the heads of the cap screws and in the nuts. The inturned ends enter the holes 67 in the nuts and the heads, and the legs of the U-shaped wires are located in the slots 65 of the heads and nuts to prevent rotation of the nuts relative to the screws and separation of the parts connected together by the cap screws.

I claim:

In a valve for controlling transmission of pressure of a pressed fluid to a device; a valve casing having a pressure chamber; an exhaust chamber and an outlet chamber, the outlet chamber separated from the pressure chamber and the exhaust chamber by oppositely disposed partitioning walls, the wall intermediate the pressure chamber and the outlet chamber having a pressure inlet port, the wall intermediate the exhaust chamber and the outlet chamber having an exhaust port and the outlet chamber having an outlet port; a movable valve member having a pair of heads connected together for simultaneous movement, one located in the pressure chamber for closing the inlet port and the other located in the exhaust chamber for closing the exhaust port; means for connecting a device to be operated by the fluid pressure to the outlet port; a lever for engaging the movable valve member to move the movable valve member against the pressure of the fluid in the pressure chamber to simultaneously open the pressure inlet port and close the exhaust port; means for actuating the lever and maintaining the lever in position to maintain the inlet port open and the exhaust port closed, the pressure in the pressure chamber operating to close the valve when the lever is released, and a pair of spring-pressed buffer members located on opposite sides of the central axis of the movable valve and operative to cushion the pressure of the movable valve member on the lever produced by the fluid pressure on the head when closing, one of the said buffer members forming a fulcrum for the lever and the other of the said buffer members forming a yielding limiting stop for the lever.

WILLIAM H. MARTIN.